UNITED STATES PATENT OFFICE.

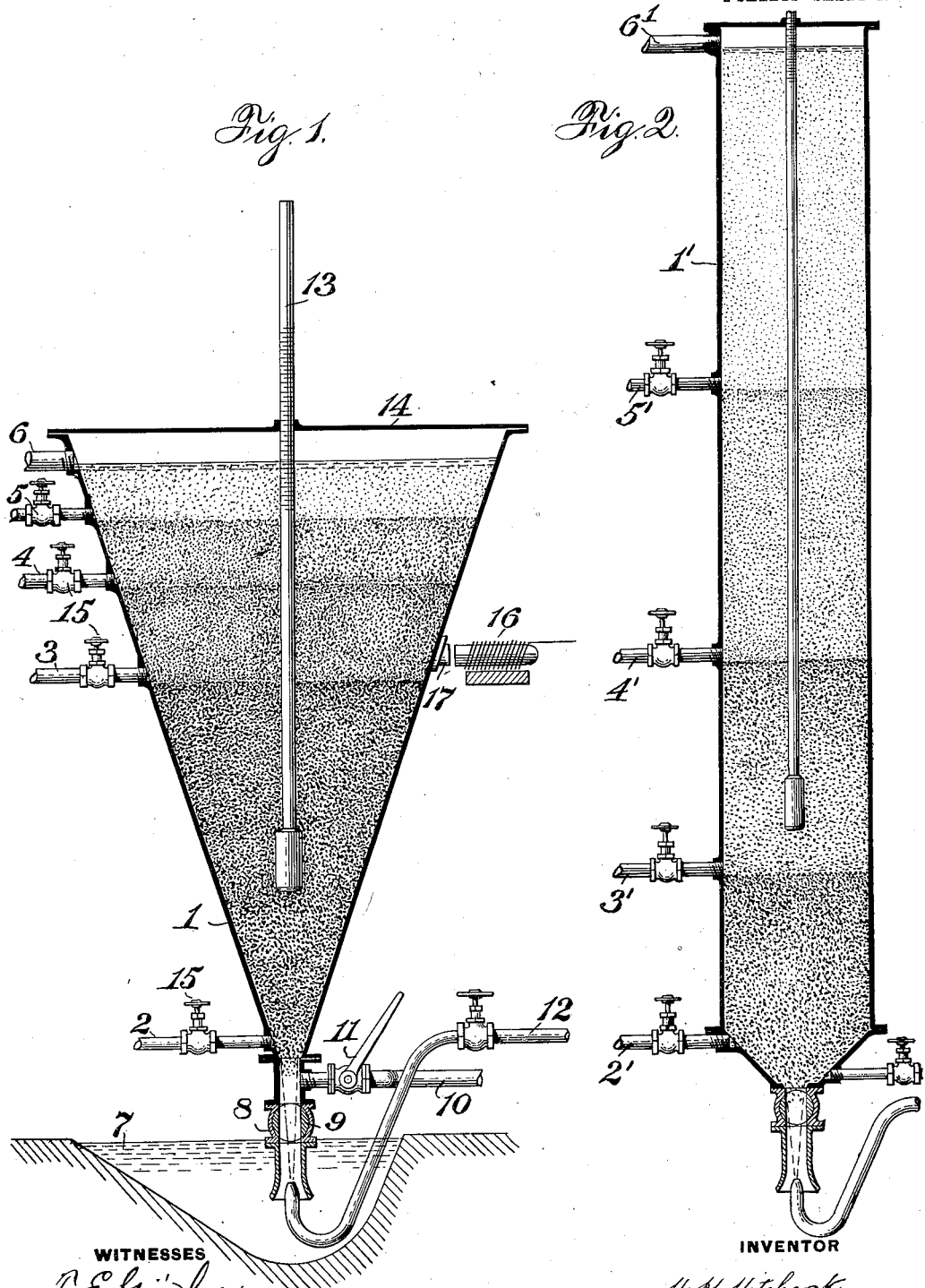

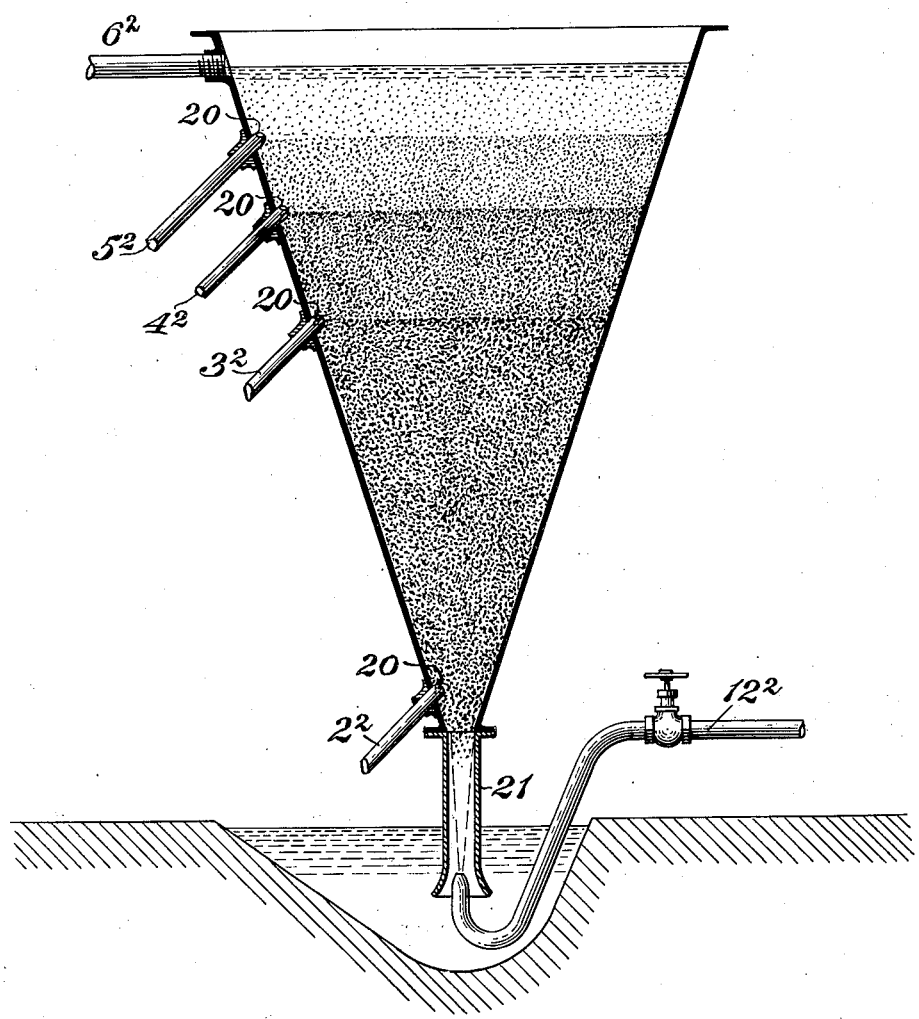

HALBERT K. HITCHCOCK, OF TARENTUM, PENNSYLVANIA.

PROCESS FOR GRADING MATERIALS.

934,441.

Specification of Letters Patent. Patented Sept. 21, 1909.

Application filed July 19, 1907. Serial No. 384,637.

*To all whom it may concern:*

Be it known that I, HALBERT K. HITCHCOCK, a citizen of the United States, residing at Tarentum, in the county of Allegheny and State of Pennsylvania, have invented certain new and useful Improvements in Processes for Grading Materials, of which the following is a specification.

My invention relates to a process for separating material comprising particles having different physical characteristics into grades each of which includes those particles having similar physical characteristics, and is applicable for example to the grading of material used as abrasives such as are employed in the grinding of glass or other substances, the binders used in ceramics and in fact to the grading of any material whatever, which it is desired to separate into grades. The invention has for its primary objects; the provision of a process wherein the separation into the various grades may be accomplished more conveniently and economically than has heretofore been the case; to provide a process wherein the grading is accomplished with greater certainty than has heretofore been possible, and in which none of the useful material is wasted; and finally, to provide a process which may be carried out by a compact and inexpensive apparatus at high rate of speed.

Certain forms of the apparatus whereby the process may be practiced are shown in the accompanying drawings, wherein:—

Figure 1 is a longitudinal section through one form of the apparatus,

Figure 2 is a longitudinal section through a second form of the apparatus, and

Figure 3 is a longitudinal section through a third form of the apparatus, in which apparatus the process is adapted to be carried on continuously.

For the sake of definite illustration, the apparatus is shown and hereafter described as applied to the grading of abrasives used in glass grinding, but it will be understood that the process is applicable to the grading of any finely divided material whatsoever, and that the scope of invention is not limited to the grading of any particular material, but is coincident with the statement of invention and claims. Briefly stated, the process consists in passing a stream of water of constantly decreasing velocity upwardly through a tank of liquid containing the material to be graded, whereby the upward velocity of the liquid counterbalances the normal downward velocity of the particles of material, when falling in the liquid, and they are held in suspension at predetermined positions in the tank, which positions depend upon the upward velocity of the liquid, and the resistance to the liquid of the particles and the weight of the particles. The particles in which the ratio of the weight to the resistance is largest take the lowest positions, as the normal downward velocity of a particle through the liquid depends upon this ratio, which ratio in particles of the same shape and density increases with the size of the particles. The larger, denser and more compact particles thus come to a position of equilibrium in a stratum in the bottom of the tank where the upward velocity is greatest, while the other particles arrange themselves in a series of strata, the ratios of weight to the resistance of the particles composing which strata decrease as the distance from the bottom of the tank increases.

Referring first to the form of apparatus shown in Figure 1 for carrying out the process as applied to the grading of abrasives used in glass grinding operations, 1 is a separating tank of the conical form shown and is provided with outlet pipes 2, 3, 4 and 5 at various levels, and the overflow pipe 6 near the top, 7 is the pit to which the mixed water and abrasives from the grinding tables are conducted, 8 is the admission pipe extending into the pit at its lower end and provided with a cut-off valve 9, 10 is a water pipe leading from the pressure main, which pipe is provided with the valve 11, 12 is a steam pipe having its lower end upwardly curved for injecting steam into the admission pipe and securing a flow of water from the pit 7 through the tank, 13 is a hydrometer for gaging the density of the mixture in the tank, which hydrometer is preferably guided on a cross support 14, and 15 are valves for controlling the flow from the pipes 2, 3, 4 and 5. In order to give a lateral agitation to the tank, which agitation under certain conditions promotes the action of the apparatus, an electro magnet 16 is provided through the coils of which an alternating current is sent to secure a movement of the armature 17 which is secured to the tank. The vibration imparted prevents the cohesion of the particles and as a result secures a proper positioning thereof, as cohering particles constitute masses whose ratios of weight to resistance in the liquid are different from those of the constituent particles. And furthermore, such vibration prevents the particles from lodging or sticking to the sides of the tank and permits of a tank with the diverging walls at an angle greater than the angle of repose for the substance in the liquid. The pipes 2, 3, 4 and 5 are located to suit requirements and give the desired volumes of liquid in the strata lying between the various pipes.

The process may be carried out in a number of ways with the above described apparatus one of which is as follows. The pit 7 being filled with a mixture of material and water, steam is admitted to the pipe 12, thus sending a stream of water upward through the pipe 8 and tank 1, and the particles gradually rise until they reach the positions at which they are in equilibrium. These positions of equilibrium lie at the points at which the upward velocity of the water from the pipe 8 equals the velocity at which the particles would normally fall through the fluid if there were no upward flow. It will be seen that the velocity of flow through the tank decreases as the distance from the bottom of the tank increases, because of the increased area of the tank at the higher levels and also from the greater tendency of the larger particles to reduce the interstitial spaces, this in itself increasing the velocity of flow at the lower levels, and that such velocity is inversely proportional to the area of the said interstitial space at any given point. As the falling velocity of a particle depends upon the ratio of its weight to the surface which is exposed to the resistance of the water, and this ratio for materials of substantially the same specific gravity increases with the weight of the particles, the particles of material composing the contents of the tank will arrange themselves in a series of grades with the average size and weight diminishing and the interstitial area increasing as the distance from the bottom of the tank increases. The inflow of water through the pipe 8 is continued until a certain predetermined density of the mixture in the tank as indicated by the hydrometer is secured, at which time the valve 9 is closed and the valve 11 opened admitting water under pressure from the main, which flow of water from the main is necessary to maintain the particles already in equilibrium at their proper height, and to carry to their proper positions the finer particles last carried in from the pit and mixed through the tank, it being understood that the flow of water with the valve 11 open is preferably the same as that which occurs when the valve 9 is open, in which case one flow takes the place of the other. The upper valve 15 is opened and the contents of the stratum above the pipe 5 is withdrawn through such pipe 5, after which the next lower stratum is drawn off, and then the next until the tank is emptied. The various strata withdrawn are conducted to proper receptacles for settling. This withdrawing operation continues until all the material in the tank is withdrawn, at which time the valve 11 is closed and the operation of filling the tank and securing the proper stratification of the various grades of material is repeated. It will be apparent that all of the material in any one stratum is not of exactly the same degree of fineness, but that the difference between the finest and coarsest material in the stratum is fixed between predetermined limits. The proportions of the tank and the flow through the pipe 8 are so arranged that none of the material, which it is desired to save, will pass out of the overflow 6, which overflow 6 carries off, however, the mud which is mixed with the material or particles too fine for use, and the surplus water introduced into the tank.

The foregoing is only one species of the broad process involved. If desired, the material to be graded may be introduced at the top of the tank and the grading secured by means of the flow of water from the pipe 10 in which case the valve 9 is, of course, closed. It is also not essential that the grades be withdrawn by means of the plurality of pipes as the entire contents of the tank may be withdrawn from the bottom pipe and the mixture used as withdrawn, or may be withdrawn in successive volumes, each of which volumes is carried to a different receptacle and settled. When all the liquid is withdrawn from the bottom pipe, the particles are preferably held in suspension during the withdrawing operation by means of a flow from the pipe 10. It will also be apparent that various means other than that shown might be used for elevating the material securing the upward flow of fluid through the tank and for securing the lateral agitation of the tank, and in fact the agitating means is in many cases omitted.

In Figure 2 I have shown another form of apparatus for carrying out the process, the difference over the apparatus of Figure 1 residing in the shape of the tank 1' which is cylindrical instead of conical. In this form of apparatus the difference in velocity of the water is due altogether in change in the interstitial spaces, as there is no change of area to reduce the velocity, due to the shape of the tank, as is the case in the apparatus of Figure 1, and in order to secure proper gradation in the material, the tank must be made of considerable height as indicated. As the particles of material at the upper levels are farther apart than at the lower levels and the quantity of material per unit volume correspondingly less as the distance from the bottom of the tank increases, the withdrawing pipes 2', 3', 4' and 5' are preferably placed farther and farther apart as the distance from the bottom increases, in order to give equal volumes of material for the different strata. The general arrangement of parts and the operation is substantially the same as that heretofore described with respect to Figure 1.

In Figure 3 I have shown still another form of apparatus for carrying out the process, which apparatus is designed for a continuous operation wherein the flow of the mixture of material and water into the bottom of the tank is continuous and the outflow from the various discharge pipes is also continuous instead of intermittent as in the structure shown in Figure 1. In this construction the pipes $2^2$, $3^2$, $4^2$ and $5^2$ are extended into the tank and provided with small openings 20, so that a very small percentage of the liquid flowing in at the bottom of the tank is discharged at such discharge openings, the bulk of the liquid passing out at the overflow pipe $6^2$. This is obviously desirable in order to prevent an undue proportion of the finer material from being diverted during its upward movement and being discharged at the opening below its position of equilibrium. The steam injector $12^2$ is provided as in the other forms of the apparatus, but as the operation is continuous no valve is necessary in the admission tube 21, and no separate water inlet is necessary. In this form of apparatus the character of the original mixture has little or no effect upon the various grades, as the proportion of material to water is so small that any change in interstitial space and resultant change in velocity due to a change in the character of the material is very slight.

Having thus described my invention and illustrated its use, what I claim as new and desire to secure by Letters Patent is the following:—

1. The process of grading finely divided material in suspension in a liquid, which consists in projecting a relatively small volume of the liquid containing such material substantially vertically at decreasing speed through a relatively large deep body of liquid free of obstruction capable of detaining the material in a state of rest, and withdrawing the desired grades directly from such relatively large deep body of liquid at different levels, while maintaining the same densities of the mixture not withdrawn during the withdrawing operation.

2. The process of grading finely divided material in suspension in a liquid, which consists in projecting a relatively small volume of the liquid containing such material substantially vertically and continuously at decreasing speed through a relatively large deep body of liquid free from obstruction capable of detaining the material in a state of rest whereby the material is stratified, supplying the material to the relatively small volume of liquid projected upwardly in such quantity as to maintain substantially uniform density in each stratum during the operation, and continuously withdrawing at different levels a volume of the mixture which is relatively small as compared with the volume of the mixture projected upwardly.

In testimony whereof I have hereunto signed my name in the presence of the two subscribed witnesses.

HALBERT K. HITCHCOCK.

Witnesses:
F. E. GAITHER,
ARCHWORTH MARTIN.